Patented Sept. 11, 1945

2,384,443

UNITED STATES PATENT OFFICE 2,384,443

PLASTIC COMPOSITION AND METHOD OF PREPARING SAME

John C. Cowan and Howard M. Teeter, Peoria, Ill., assignors to Claude R. Wickard, as Secretary of Agriculture of the United States of America, and his successors in office No Drawing. Application November 6, 1942, Serial No. 464,787

13 Claims. (Cl. 106—249)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to high molecular weight polymerization products and more particularly to products derived from esters of polymeric fat acids.

One object of the invention is to provide plastic compositions suitable for use as substitutes for natural rubber.

Another object of the invention is to provide methods of converting esters of polymeric fat acids to rubber-like plastic compositions.

Other objects of the invention will be apparent from the following description.

Fat acids are aliphatic acids which occur usually in the form of their esters, such as the glyceryl esters, in natural and in processed fatty and oily materials of vegetable and animal origin.

Fat acids the acyl radical of which contains at least one carbon to carbon double bond are capable of undergoing polymerization, for instance as a result of thermal treatments, and this property is common to a number of compounds containing acyl radicals of polymerizable fat acids. The polymerization is an intermolecular condensation which proceeds through the unsaturation of the acyl radicals of the polymerizable fat acids. The products consist mainly of monomeric unpolymerized compounds and dimeric and trimeric compounds which were formed respectively by union of two or three molecules.

Polymeric fat acids are derived from polymerization products obtained by subjecting substances containing polymerizable fat acids or their derivatives, such as glycerides or other esters to polymerization with subsequent elimination of the non-polymerized or monomeric fraction of the treated material.

For instance polymeric fat acids may be obtained from fatty oils containing glycerides of polymerizable fat acids, such as oils of the drying and semi-drying type like oils of peanut, cottonseed, wheat, soybean, corn, linseed, perilla oil, tung oil or dehydrated castor oil. These oils can be polymerized in the usual manner by thermal treatment in the presence or in the absence of suitable polymerization catalysts. The polymeric glycerides may be saponified and the polymeric fat acids separated from the non-polymeric fat acids by distillation or extraction.

Another procedure suitable for the production of polymeric fat acids consists in subjecting the fatty oils to alcoholysis with monohydric alcohols, such as methanol or ethanol, thereby converting the glycerides of the fat acids to the corresponding monohydric esters. These esters are then polymerized yielding monohydric esters of polymeric fat acids which can be segregated from the reaction products by distillation and converted to polymeric fat acids by hydrolysis.

Still another method for preparing polymeric fat acids consists in producing the free fat acids by hydrolysis of the fatty material and then polymerizing the free fat acids.

The polymeric fat acids obtained by any of the foregoing procedures consist primarily of dibasic dimeric fat acids, having an average molecular weight of about 560, admixed with tribasic trimeric fat acids the average molecular weight of which is approximately 840. If desired, the dibasic dimeric fat acids may also be obtained substantially free from admixtures, for example by distillation under reduced pressure.

Cowan and Ault in their application Serial No. 432,126 filed February 24, 1942, have disclosed a method whereby viscous or plastic rubber-like materials can be produced by vulcanization of dihydric alcohol polyesters of polymeric fat acids. According to this method polymeric fat acids obtained by any of the aforementioned procedures are first esterified by reacting them with approximately equimolar portions of dihydric alcohols such as glycols of the polymethylene series like hexamethylene glycol or of glycols of the polyethylene series such as ethylene glycol, diethylene glycol, or with other dihydric alcohols. The dihydric polyesters of polymeric fat acids are then converted to viscous or plastic rubber-like products by vulcanization, that is, by reacting them in the usual manner with compounds of sulfur, tellurium, selenium or with other known vulcanizing agents.

The products thus obtained while valuable as components or intermediates in the manufacture of various synthetic materials such as plasticizers, resins, plastics and adhesives, possess certain properties which reduce their utility as substitutes for natural rubber. The high viscosity and pronounced tackiness which characterize many of the polyesters of polymeric fat acids, cause them to adhere tenaciously to mechanical devices commonly used in processing rubber compositions.

They cannot be milled into sheets, or extruded through dies or into molds, and upon vulcanization they frequently yield defective foraminated products.

We have discovered that dihydric alcohol polyesters of polymeric fat acids can be converted to products having properties more closely approximating those of natural rubber by subjecting them to a curing process.

The curing process consists in first forming an intimate mixture of the dihydric polyester of polymeric fat acids with a vulcanizing agent, and thereafter subjecting the mixture to a heat treatment. The curing process of this invention is applicable to dihydric alcohol polyesters of polymeric fat acids obtained by polymerization of fatty oils, or of various fractions or derivatives thereof. For example, it is applicable to dihydric alcohol polyesters of dibasic dimeric fat acids or of mixed dimeric and trimeric fat acids. Accelerators of vulcanization, accelerator activators, and reinforcing agents may also be added. The term "reinforcing agent" is used to designate a substance such as carbon black, whiting, oxide of iron, and other materials which impart to natural rubber strength and serviceability beyond that possessed by a pure gum vulcanizate.

Thorough blending of the ingredients is attained by submitting the mixture to kneading or mastication until a substantially homogeneous product is formed. The heat treatment or "baking" step of the curing process is effected by heating the homogenized mixture at about 100–200° C. for a length of time necessary to impart to the treated material the desired plastic properties. The duration of this heat treatment may vary considerably depending upon the properties of the starting material, the amount and nature of the compounding agents and the operating conditions.

The curing process converts the dihydric polyesters of polymeric fat acids to porous, elastic substances having considerable tensile strength and substantially free from objectionable tackiness. The cured material can therefore be processed in a manner analogous to that used in milling natural rubber and be reduced to a plastic state which allows it to be milled into sheets, calendered onto cloth, extruded through dies or into molds, and subjected to other similar operations.

The curing process of this invention not only yields plastic products which can be processed by means of standard equipment following conventional methods commonly employed in the manufacture of rubber compositions but also results in materials having increased tensile strength and elasticity. Thus, for instance, some samples of dihydric polyesters of polymeric fat acids vulcanized in the mold without preliminary curing yielded products having a tensile strength of about 100–360 pounds per square inch, while the polyesters cured according to the method of this invention and then vulcanized in a mold had tensile strengths of 250–700 pounds per square inch. Vulcanizates obtained from the same polyester sample possessed 300 to 475 pounds per square inch higher tensile strength when the curing step was included than when the curing step was omitted in the processing.

The elastic properties and tensile strength of the plastic rubber-like compositions derived from dihydric alcohol polyesters of polymeric fat acids may be further enhanced by heating the polyesters prior to the addition of vulcanizers and compounding agents at 200–250° C. until the viscosity of the heated material has reached a value just short of gelation. For example, a vulcanizate made from an ethylene glycol-polyester which had been carried to a viscosity of approximately 1.5 poises at 200° C. had a tensile strength of 250 pounds per square inch with an elongation of 125 per cent. However, a vulcanizate made from an ethylene glycol-polyester carried to a viscosity of approximately 50 poises at 200° C. gave a tensile strength of 410 pounds per square inch at an elongation of 125 per cent. For method used in determination of viscosity of polyesters, see P. J. Flory, J. Am. Chem. Soc. 62, 1058 (1940).

This treatment appears to induce further esterification with an increase in the average molecular weight of the polyesters.

As illustrative embodiments of a manner in which our invention may be carried out in practice the following examples are given:

*Preparation of polymeric fat acids*

Soybean oil was subjected to methanolysis by refluxing for 2 hours a mixture of 32.08 kilograms soybean oil, 30.8 kilograms methanol and 160 grams sodium methoxide. The excess methanol was then removed by distillation, the residue was allowed to stratify and the ester layer was separated from the glycerol layer and distilled. The distilled methyl esters of fat acids were polymerized by heating them in a carbon dioxide atmosphere at 300° C. for 16 hours using 82 grams of anthraquinone as a polymerization catalyst. The reaction products were distilled in vacuum yielding 15.62 kilograms of unpolymerized distillate (boiling range: 180–230° C./10 mm.) and 11.02 kilograms of still residue consisting of polymeric methyl esters. This residue had a refractive index of 1.4814 at 30° C. and it was saponified by refluxing for 7 hours with 4.59 kilograms potassium hydroxide and 18 liters of ethanol. The ethanol was then distilled off, the residue was acidified with aqueous hydrochloric acid and heated with agitation. The free polymeric fat acids thus obtained were then washed free of hydrochloric acid and dried by heating under reduced pressure yielding 10.56 kilograms of dry material.

Polymeric fat acids derived from other fatty oils were obtained by similar procedures. The acid values and refractive indices of some of these products were as follows:

| Polymeric fat acids from— | Acid value | Refractive index at 30° C. |
|---|---|---|
| Soybean oil | 187 | 1.4916 |
| Dehydrated castor oil | 187 | |
| Corn oil | 180 | |
| Linseed oil | 183 | 1.5026 |

*Preparation of dihydric alcohol esters of polymeric fat acids*

The polymeric fat acids were esterified by heating them with an equimolar amount (or with a slight excess) of dihydric alcohol. Nitrogen gas was bubbled through the mixture while maintaining the temperature first at 170–180° C. for about 2 hours and then at 200–210° C. until the desired degree of esterification was attained as indicated by the acid values and the neutralization equivalent of the reaction products.

Upon further heating at 200–250° C. an increase in the viscosity of the dihydric alcohol polyesters of polymeric fat acids occurred. It was found that the rubber-like plastic composition produced from the polyesters thus treated possess higher tensile strength. For tensile strengths and elongation data on low- and high-viscosity ethylene glycol-polyesters, see table given on compounding data.

The composition and properties of some of the polyesters obtained were as follows:

| Polymeric fat acids obtained from— | Acid value | Amount | Esterified with— | | Dihydric esters obtained | | |
|---|---|---|---|---|---|---|---|
| | | | Dihydric alcohol | Amount | Yield | Acid value | Neutral equivalent |
| Soybean oil | 187 | 10.56 kg | Ethylene glycol | 1.2 kg | 10.75 kg | 17.8 | 3,140 |
| Linseed oil | 183 | 12.78 kg | do | 1.41 kg | 12.76 kg | 20.9 | 2,660 |
| Dehydrated castor oil | 187 | 100 g | Diethylene glycol | 18.5 g | 106 g | 13.1 | 4,280 |
| Do | 187 | 100 g | Tetraethylene glycol | 34 g | 120 g | 15.3 | 3,640 |
| Do | 187 | 100 g | Hexaethylene glycol | 49.4 g | 131 g | 16.5 | 3,400 |
| Corn oil | 180 | 100 g | Trimethylene glycol | 12.8 g | 100 g | | |
| Do | 180 | 100 g | Hexamethylene glycol | 20 g | 105 g | 17.1 | 3,280 |
| Dehydrated castor oil | 187 | 100 g | Decamethylene glycol | 29.4 g | 112 g | 13.1 | 4,280 |
| Soybean oil | 187 | 1.05 kg | Ethylene glycol | 120 g | 1.08 kg | 15.3 | 3,670 |
| Oleic acid fraction from olive oil.[1] | 193 | 24.8 g | do | 2.9 g | 25.8 g | 5.8 | |

[1] Oleic acid fraction was obtained by crystallization of olive oil acids, first at approximately 20° C. to remove saturated acids and then at 40° C. to precipitate oleic acid fraction.

*Curing process*

The dihydric polyesters of polymeric fat acids were compounded according to the following formula which was found to be satisfactory:

| | Parts |
|---|---|
| Dihydric esters of polymeric fat acids | 100 |
| P-33 gas black | 40 |
| Sulfur (sublimed) | 4.2 |
| Zinc oxide | 4 |
| "Captax" (mercaptobenzothiazole) | 1.34 |

The mixing was effected in a Banbury mixer, Baker Perkins mixer or on a rubber mill. Following thorough mixing the sticky viscous material was spread in layers about one-half inch thick on metal trays and "baked" in an oven at 150° C., until a sample of the treated material could be readily milled into sheets on a rubber mill. Also, the compounded material could be heat cured in the mixer or on the mill.

Samples of cured and uncured materials compounded according to the above formula were then vulcanized in the mold.

The difference in ease of handling of cured compounded polyesters as compared to the uncured material of identical composition was evident in a number of operations.

For example, in filling a mold the cured material could readily be milled and cut to proper size for vulcanization. The uncured material could not be milled into sheets and was extremely difficult to place evenly in a mold or to extrude into the mold.

The time required for obtaining a product which could be removed intact from the mold was much longer when uncured material was used. Vulcanization of cured material could be effected at 140° C. in 30–40 minutes. Uncured material required about 3½ hours at 150° C. to give a product which could be used for test purposes. When cured material was used, removal from the mold could be effected while still hot, but attempts to remove uncured vulcanized products from the mold without cooling always resulted in samples unsuitable even for tensile strength tests.

A number of dihydric polyesters of polymeric fat acids were compounded according to the following formula:

| | Parts |
|---|---|
| Polyester (dihydric esters of polymeric fat acids) | 100 |
| Carbon black P-33 | 80 |
| Sulfur (sublimed) | 6.4 |
| Zinc oxide | 6.0 |
| Captax | 2.0 |
| Agerite resin D | 1.0 |

The following table shows the effect of the curing process on some mechanical properties of vulcanizates obtained from four different dihydric esters of polymeric fat acids compounded according to the above formula. In addition, the table shows the effect of different glycols used in the preparation of the polyester on the properties of the vulcanizate.

| Polyester from— | | Mold vulcanized material | | | |
|---|---|---|---|---|---|
| | | Cured prior to vulcanization | | Uncured | |
| Dihydric alcohol | Polymeric fat acids obtained from— | Tensile strength, lbs. per sq. in. | Percent elongation at break | Tensile strength, lbs. per sq. in. | Percent elongation at break |
| Ethylene glycol | Soybean oil | 410 | 125 | 186 | 100 |
| Diethylene glycol | Dehydrated castor oil | 630 | 130 | 189 | 74 |
| Tetraethylene glycol | do | 570 | 120 | | |
| Hexaethylene glycol | do | 660 | 150 | | |
| Trimethylene glycol | Corn oil | 490 | 150 | | |
| Hexamethylene glycol | do | 580 | 180 | 364 | 138 |
| Decamethylene glycol | Dehydrated castor oil | 700 | 200 | 226 | 131 |
| Ethylene glycol | Linseed oil | 650 | 125 | | |

While the aforementioned compounding formulas have been found to yield satisfactory results in the production of rubber-like composition from dihydric alcohol polyesters of polymeric fat acids, the proportions and the nature of the individual components may be varied considerably.

For example, the amounts of compounding reagents may be varied within wide limits and still obtain a millable and readily vulcanizable product. Satisfactory products have been obtained using from 0-100 parts of carbon black, 0-12 parts of sulfur, 0-10 parts of zinc oxide in conjunction with accelerators, antioxidants and other compounding ingredients. P-33 gas black may be replaced by other similar products such as "Kosmobile" and "Kosmos 20." Other reinforcing agents like oxides of iron can be added. "Captax" may be replaced by other accelerators such as for example "Altax" (Benzothiazyl disulfide) or "Monex" (tetramethylthiuram monosulfide).

Suitable mixtures of accelerators may also be used, such as Butyl Zimate with Captax, Tuads with Captax and others.

Age resistors like "Agerite resin D" (believed to be a reaction product of Aldol-α-naphthylamine) and other standard rubber compounding agents may be mixed with the polyesters prior to curing.

Either ferric oxide or carbon black alone can be used as reinforcing agents.

All or only a portion of the compounding agents may be added before the heat curing at 150° C. Additional compounding agents may be added by milling after heat curing rather than before. Such materials have improved properties as compared with uncured vulcanizates.

The following table gives data obtained on compounding of the ethylene glycol polyester with different reinforcing agents and accelerators.

3. The process of manufacturing a plastic composition comprising forming an intimate mixture of a dihydric alcohol polyester of a polymeric fat acid with a vulcanizing agent, baking the mixture at 100° to 200° C. until it becomes millable, and then plasticizing the resulting composition by milling.

4. The process comprising forming an intimate mixture of a dihydric alcohol polyester of a polymeric fat acid with a vulcanizing agent, baking the mixture until it becomes millable, and then plasticizing the resulting composition by milling, followed by vulcanization.

5. The process of manufacturing a plastic composition comprising forming an intimate mixture of a dihydric alcohol polyester of a polymeric fat acid with a vulcanizing agent, baking the mixture at 100° to 200° C. for 45 to 180 minutes, and then plasticizing the resulting composition by milling.

6. The process as defined by claim 2, in which a vulcanization accelerator is added to the mixture.

7. The process as defined by claim 2, in which a vulcanization accelerator and an accelerator activator are added to the mixture.

8. The process as defined by claim 2, in which a reinforcing agent is added to the mixture.

9. The process of producing a plastic composition comprising intimately mixing a polyester of an alcohol of the polymethylene series and a polymeric fat acid with a vulcanizing agent, heating the mixture until it becomes millable, and then plasticizing the resulting composition by milling.

10. The process of producing a plastic composition comprising intimately mixing a polyester

| Ethylene glycol polyester | (1) 100 | (2) 100 | (3) 100 | (4) 100 | (5) 100 | (6)[1] 100 | (7) 100 | (8)[2] 100 |
|---|---|---|---|---|---|---|---|---|
| P-33 (carbon black) | 80 | 80 | | | | 80 | | |
| Kosmobile (carbon black) | | | 80 | | | | | |
| Kosmos 20 (carbon black) | | | | | | | | 60 |
| Mapico red 297 (ferric oxide) | | | | 80 | | | | |
| Atomite (calcium carbonate) | | | | | 80 | | | |
| Sulfur | | | | | | | 100 | |
| Zinc oxide | 6.4 | 6.4 | 6.4 | 6.4 | 6.4 | 6.4 | 6.4 | 6.4 |
| Titanox A | 6 | 6 | 6 | 6 | 6 | 6 | | 6.0 |
| Captax | | | | | | | 50 | |
| B. J. F. | 2 | | 2 | 2 | 2 | 2 | | 2.0 |
| Altax | | | | | | | 1.5 | |
| Monex | | 2 | | | | | | |
| Agerite resin D | 1 | 1 | 1 | 1 | 1 | 1 | 0.5 | 1.0 |
| Baking time, 150° C., min | 145 | 145 | 145 | 145 | 145 | 180 | 45 | |
| Brittle Pt., ° C.[3] | −24.5 | | −25 | −26 | −32 | −24.5 | | |
| Tensile strength, p. s. i | 400 | 410 | 625 | 725 | 375 | 250 | 397 | 286 |
| Percent elongation at break | 120 | 125 | 120 | 140 | 150 | 125 | 97 | 70 |

Notes

[1] Polyester—Viscosity at 200° C. approximately 1.5 poises. See P. J. Flory, J. Am. Chem. Soc. 62, 1058 (1940). All other ethylene glycol polyester samples had viscosities of approximately 45–60 poises by Flory's method.
[2] Polyester prepared from dimerized fat acids obtained from an oleic acid fraction of olive oil.
[3] Determined by method of M. L. Selker, C. G. Winspear, and A. R. Kemp, Ind., Eng. Chem. 34, 157 (1942).

Having thus described our invention we claim:

1. The process of manufacturing a plastic composition comprising intimately mixing a dihydric alcohol polyester of a polymeric fat acid with rubber compounding agents, heating the mixture until it becomes millable and then plasticizing the resulting composition by milling.

2. The process of manufacturing a plastic composition comprising forming an intimate mixture of a dihydric alcohol polyester of a polymeric fat acid with a vulcanizing agent, baking the mixture until it becomes millable, and then plasticizing the resulting composition by milling.

of an alcohol of the polyethylene series and a polymeric fat acid with a vulcanizing agent, heating the mixture until it becomes millable, and then plasticizing the resulting composition by milling.

11. The process of manufacturing a plastic composition comprising intimately mixing an ethylene glycol polyester of a polymeric fat acid with a vulcanizing agent, heating the mixture until it becomes millable, and then plasticizing the resulting composition by milling.

12. The process of manufacturing plastic compositions which comprises intimately mixing a dihydric alcohol polyester of polymeric fat acids derived from poly-unsaturated fat acids with a vulcanizing agent, then heating the mixture until millable, and then plasticizing the resulting composition by milling.

13. The process as defined by claim 12, in which the poly-unsaturated fat acids are chosen from the group consisting of soybean fat acids, linseed fat acids, and dehydrated castor fat acids.

JOHN C. COWAN.
HOWARD M. TEETER.